United States Patent
Hay et al.

(10) Patent No.: US 8,225,222 B2
(45) Date of Patent: Jul. 17, 2012

(54) SECURITY APPARATUS

(75) Inventors: Andrew Charles David Hay, Weston-Super-Mare (GB); Siani Lynne Pearson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3426 days.

(21) Appl. No.: 09/931,657

(22) Filed: Aug. 16, 2001

(65) Prior Publication Data

US 2002/0089528 A1 Jul. 11, 2002

(30) Foreign Application Priority Data

Aug. 18, 2000 (GB) .................................. 0020438.8

(51) Int. Cl.
*G06F 13/00* (2006.01)
*G06F 15/00* (2006.01)

(52) U.S. Cl. ........................................ 715/763; 715/767
(58) Field of Classification Search ................... 713/100, 713/168, 2, 202, 200; 715/767, 850, 855, 715/880, 763–765, 840, 851–853, 841–843, 715/734, 736; 709/225, 229
See application file for complete search history.

(56) References Cited

U.S. PATENT DOCUMENTS

| | | | |
|---|---|---|---|
| 5,421,006 A | 5/1995 | Jablon et al. | |
| 5,537,540 A | 7/1996 | Miller et al. | |
| 5,809,230 A * | 9/1998 | Pereira | 726/35 |
| 5,919,257 A | 7/1999 | Trostle | |
| 5,966,441 A * | 10/1999 | Calamera | 713/167 |
| 6,009,524 A | 12/1999 | Olarig et al. | |
| 6,209,099 B1 * | 3/2001 | Saunders | 726/22 |
| 6,223,284 B1 * | 4/2001 | Novoa et al. | 713/100 |
| 6,415,280 B1 | 7/2002 | Farber et al. | 707/2 |
| 6,510,419 B1 * | 1/2003 | Gatto | 705/36 |
| 6,530,024 B1 * | 3/2003 | Proctor | 726/23 |

FOREIGN PATENT DOCUMENTS

| | | |
|---|---|---|
| DE | 43 15 732 C1 | 6/1994 |
| EP | 0 417 889 A2 | 3/1991 |
| EP | 0 828 209 A2 | 3/1998 |
| EP | 1 030 237 A1 | 8/2000 |
| WO | 00/48063 | 8/2000 |

* cited by examiner

*Primary Examiner* — Cao "Kevin" Nguyen

(57) ABSTRACT

An apparatus and methods for modifying the security status of a computer component are disclosed. The apparatus represents a plurality of computer components; represents interactions among the plurality of computer components; and allows modification of a security setting associated with at least one of the computer components. The methods disclosed teach depicting a plurality of computer components; depicting interactions among the plurality of computer components; and modification of a security setting associated with at least one of the computer components.

17 Claims, 11 Drawing Sheets

SECURITY APPARATUS

BACKGROUND ART

Trust in the context of networked communication typically comprises factors such as the ability for a user of a computer system to feel confident that they know who and what they are talking to, that the communication is confidential and that the information is transmitted accurately. In a world where software attacks are not uncommon, this trust cannot be taken for granted and is preferably based upon technological mechanisms. Many security-related mechanisms are or will shortly be available, and each can enable certain types of communication or information to be trusted to differing degrees.

For example, in order to build a trusted relationship between the computing apparatus and its users, one solution that has been proposed [EP patent application 99301100.6], involves platform integrity checking. With this solution, the computing apparatus has a physical located trusted device, which is used to make trusted measurement and trusted reporting for each functional component. This solution allows devices to challenge the trusted device in order to check integrity of one particular component. Then, the trusted device will respond to the challenge by sending a signed report of this functional component. The report tells the challenging device related information about the component, such as the model of the component, manufacturer of the component, version of the component, upgraded data and so on. After receiving the response, the challenger will make its own decision whether or not to trust this particular component, and furthermore after checking a number of selected functional components, the challenger will make a decision whether or nor to trust the computing apparatus.

However, these prior art solutions do not deal with how a user is able to appreciate or better understand these security mechanisms such as platform integrity checking, different types of platform identity that can be trusted to varying degrees, more and less protected forms of storage, hardware versus software-based security, cryptographic functionality, and so on, and further to be able to use such information to select the most appropriate solution in order to try to ensure that the communication or computer-based action in which the user engages can be trusted (that is to say that it always behaves in the expected manner for the intended purpose).

Computer-based training is a well known, and commonly used, technique for training users, typically using interactive techniques, on the operation of a number of software applications. Its success lies in the fact that the instructional method uses the actual end-user software to illustrate and demonstrate proposed tasks and procedures. Computer based training tends to be a one-off educational affair, designed to achieve an eventual level of expertise. Therefore, computer based training will typically cover all features relating to a software application, where or not this feature is likely to be used by a user. Additionally, the computer based training on a feature typically occurs sometime before the feature is likely to be used in practice, which can result in a user forgetting important aspects of the feature highlighted by the training.

Additionally, the psychological component of Human-Computer-Interaction (HCI) describes the way people 'think' about machines and their functions. People have 'schemas' or 'mental models', which are their own simplified framework models of a system that allows the user to store knowledge about the system (Schemas and mental models are general cognitive psychology concepts). Because computers are very complex systems, the process of a person developing an adequate 'mental model' of computer security from their very limited (and very high-level) experience of computer security, is very unlikely. Undeveloped models are fragmented and do not allow people to make trustworthy predictions from them, which is a possible reason people do not actively engage in using or seeking out computer security—the costs (due to the complexity) are perceived to be too high.

SUMMARY OF THE INVENTION

In accordance with a first aspect of the present invention there is provided a security apparatus comprising a receiver for receiving a security metric associated with a computer entity; means for presenting to a user the security metric; means for modifying a security setting associated with the computer entity to enable the modification of the security metric associated with the computer entity.

Preferably the security metric is presented to a user as a representational model of software and/or hardware functionality of the computer entity.

Preferably the security apparatus further comprising input means for allowing a user to interact with the modifying means to modify the security setting.

Preferably the security apparatus further comprising means for establishing possible modifications to the security setting based upon the received security metric.

Preferably the level of complexity of the presented is selectable by a user.

In accordance with a second aspect of the present invention there is provided a method for modifying the security status of a computer apparatus, the method comprising receiving a security metric associated with a computer entity; presenting to a user the security metric; modifying a security setting associated with the computer entity to enable the modification of the security metric associated with the computer entity.

Preferably an interface assistant explains and teaches users about the risks that a security apparatus, typically a computing apparatus, is designed to combat so that users understand and/or can better employ the available trust-enhancing features and services provided by the computer apparatus. This interface assistant is a software user interface that uses an internal real time representational model of software and hardware functionality to represent security risks to the user, to highlight or explain trust- or privacy-enhancing features of the platform, to display security choices related to the user's current or next desired action and/or to allow the user to configure security settings.

The interface assistant, which is typically implemented as a software application, assists users to understand and make choices about trusted mechanisms on their computing apparatus by means of an interactive instructional feedback 'assistant' which represents to the user certain security risks in a simplified fashion, i.e. present security metrics in a simplified fashion.

Preferably the interface assistant is modelled on a 'real-time' representational model of software and hardware functionality that acts as an important source of feedback to the user, and all functionality is through the same "porthole" of the interface, which is the system model.

Preferably, the interface assistant also includes a trusted platform hardware control that acts as the functional component of the interface assistant and allows the user to define trusted platform security settings, as well as control software and hardware within the computer in a way that may increase computer security, i.e. allows a user to modify security settings. This trusted platform hardware control will take a similar form to the interactive instructional feedback assistant, but its functionality will depend on what mechanisms for increasing platform security exist in the corresponding computing apparatus. Preferably, these security settings are protected from being altered by an unauthorised entity.

Optionally, the trusted platform hardware control allows users to request certain security metrics from any trusted computing apparatus which are reported back to the user via the user interface, by using the integrity reporting mechanism as described in EP patent application 99301100.6.

Optionally, the trusted hardware control allows the user to isolate or quarantine files, folders, programs or even hardware devices by selecting the representation of these objects within the trusted hardware control and then requesting the operating system to place these devices within different compartments within the computer apparatus.

Preferably, a history of the user's cancelled tasks when using the interactive instructional feedback 'assistant' may be saved for future reference by storing such tasks in a short-term memory store within the computing apparatus.

Optionally, the invention provides a method of establishing a security configuration database by listing the user's chosen security-related configuration of functional components and related information Optionally, the invention provides a method of protecting this configuration list in a secure manner if required by using either a trusted token of the user or the protected storage of the computing apparatus.

Optionally, the invention provides a method of protecting this interface assistant in a secure manner by using an integrity measurement on the interface assistant as part of a trusted boot process or platform integrity check. By these means a challenger would be able to detect if the interface assistant had been altered in an unauthorised manner.

The interactive instructional feedback assistant allows incremental instruction on particular security tasks, rather than requiring the user to spend a large amount of time completing full instruction on the whole system. This provides the advantage of distributing the costs of implementing the security features over time, making the use of such features more likely. Additionally, as the security functions provided by the trusted platform hardware control will be presented to the user when relevant, on a level which is relevant to them, means that all functions are likely to be viewed and employed at some time or other when required, rather than the user having to spend time setting up all features before using any, or having to search out required features. This will reduce the amount of functions that are not used because they are not found The interface assistant is based on the concept of modelling system behaviour in a way which is relevant both to the user and to the tasks a user may wish to carry out, while ensuring that the costs to the user (from lost time, etc) are kept to a minimum in relation to the benefits which the added security can give, and can be conveyed to the user. The interface assistant represents to users a model of the system structure and system behaviour that is relevant and simple (i.e. security settings at an appropriate level of complexity). By doing this, the user feels involved in the security of their computer at a level at which can feel competent.

Construction of a simple model of a computer apparatus and its major components allows a ready-made framework to be created for users that is complete and comprehensible; where a modern computing apparatus typically includes many different components (the word "component" is used here to describe essentially any discrete functional element of a computing platform, including either a piece of hardware, a piece of software or a piece of firmware), most of which are standardised and can be upgraded.

With a framework model of the computer system to refer to, simple representations of computer behaviour can easily be conveyed to users. With a relevant framework available to users, and an understanding of computer behaviour in relation to that framework, then users can be shown aspects of the computer behaviour (i.e. security settings) that may be made more secure (in terms of the model). Thus, security and privacy risks can be represented to users in terms of the simple system model, which allows a high-level understanding of the computer's security issues to be developed, alongside a high-level understanding of security tools, which is 'relevant' to the users. Users are given a complete understanding of the system from the system model, from a high-level, which compares to a previously untrusted and incomplete model of system behaviour that may have existed on many levels. A trusted model leads to trustworthy predictions which allows the user to feel confident about having a high-level control of the system security, with maybe some help and instruction from an assistant to the model that fills in knowledge gaps, and shores-up the model.

This provides the advantage of conveying the functionality of trusted computing apparatus in relation to existing hardware structures within the computing apparatus, in a simplified way. Having an interface assistant that explains and teaches users about the risks that trusted computing apparatus is designed to combat, will ensure users that better employ the available services provided by such apparatus.

BRIEF DESCRIPTION OF THE DRAWINGS

Preferred embodiments of the present invention will now be described, by way of example only, with reference to the accompanying drawings, of which.

DESCRIPTION OF AN EMBODIMENT

Figure 1:
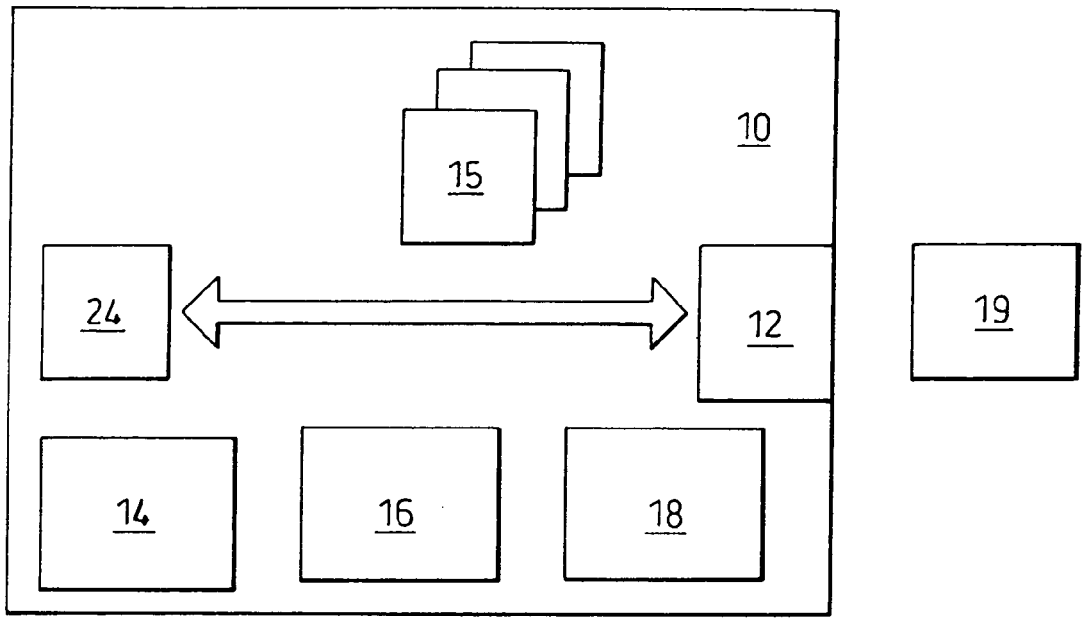
FIG. 1 is a diagram that illustrates a system capable of implementing embodiments of the present invention.
Figure 2:
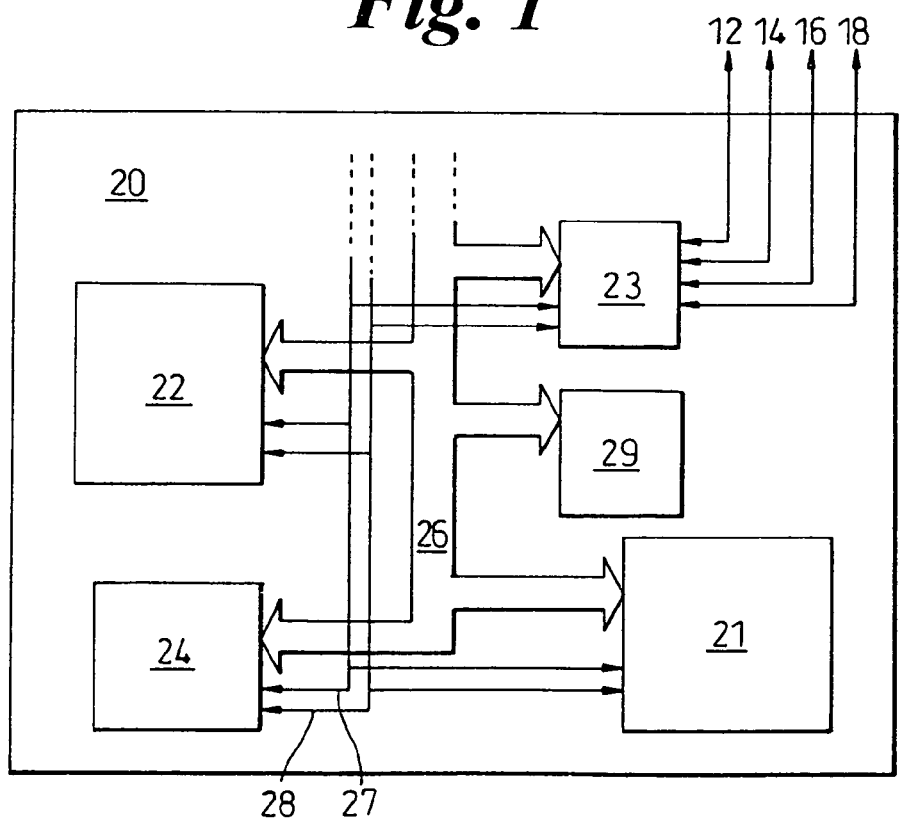
FIG. 2 is a diagram, which illustrates a motherboard including a trusted device arranged to communicate with a smart card via a smart card reader and with a group of functional components.

A trusted platform 10 is illustrated in the diagram in FIG. 1. The platform 10 includes the features of a keyboard 14, mouse 16 and visual display unit (VDU) 18, which provide the physical 'user interface' of the platform. In the platform 10, there are a plurality of modules 15: these are other functional elements of the trusted platform of essentially any kind appropriate to that platform (the functional significance of such elements is not relevant to the present invention and will not be discussed further herein). As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and devices external to the platform 10, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown), in particular an interface assistant software application, as describe below. The interface assistant application enables a model of the system structure and system behaviour to be presented to a user and assist users to understand and make choices about trusted mechanisms on the trusted platform 10. Alternatively, the interface assistant application can be configured, with platform 10, to aid the understanding of trusted mechanisms on an alternative platform (not shown). Typically, in a personal computer the BIOS program is located in a special reserved memory area, the upper 64 K of the first megabyte do the system memory (addresses FØØØh to FFFFh), and the main processor is arranged to look at this memory location first, in accordance with an industry wide standard.

In this embodiment after reset, or initialisation, of the platform 10, the main processor is initially controlled by the trusted device 24, which then hands control over to the platform-specific BIOS program, which in turn initialises all input/output devices. After the BIOS program has executed, control is handed over by the BIOS program to an operating system program, such as Windows NT (TM), which is typically loaded into main memory 22 from a hard disk drive (not shown).

Alternatively, however, the main processor can be initially controlled by the platform-specific BIOS device.

For the purposes of minimising subversion of the platform 10 the BIOS boot block is preferably contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
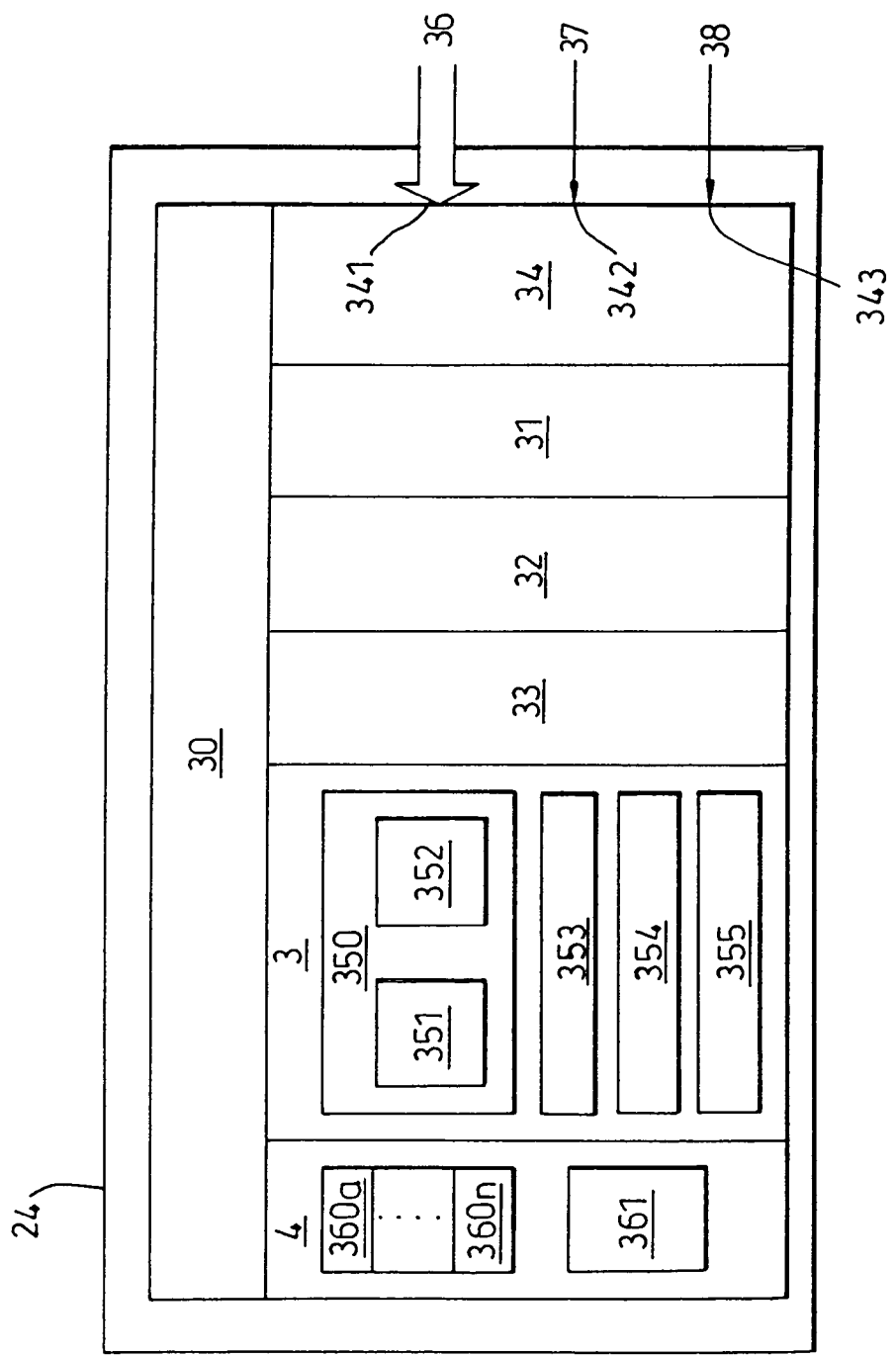
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of micro-electronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level.

Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
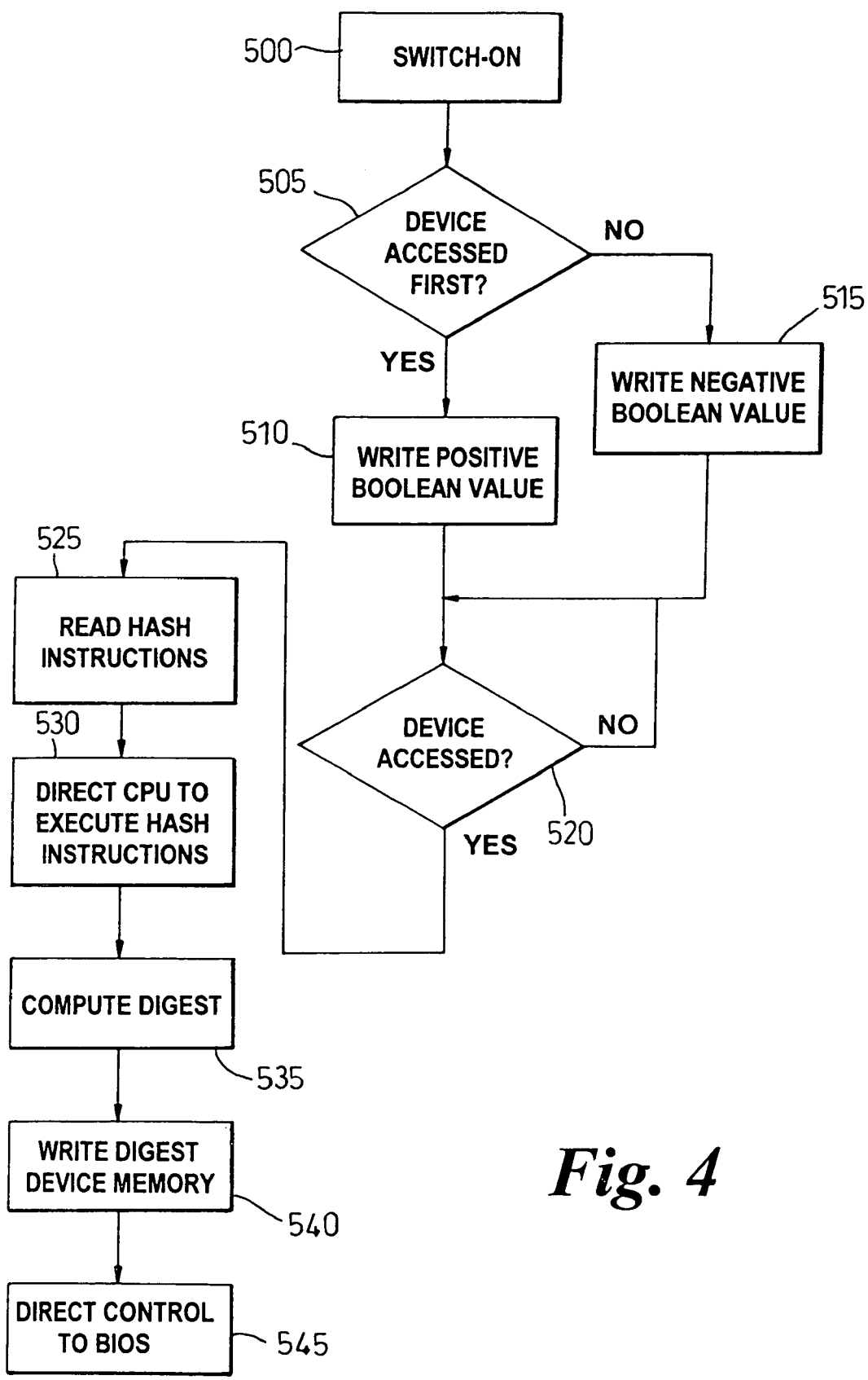
FIG. 4 is a flow diagram that illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. The main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner. Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 24 and the platform. Also, although in the present embodiment the trusted device 24 utilizes the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

It is desirable for the interface assistant application 500 to be run on a trusted platform, as described above, however this is not essential.

Figure 5:
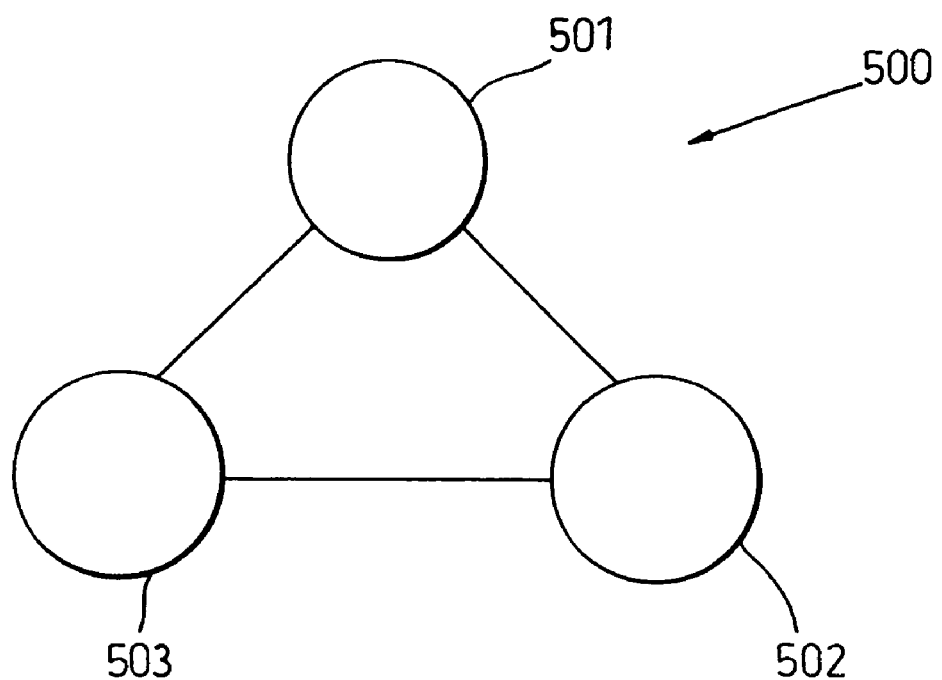
FIG. 5 is a block diagram of the interface assistant.

The interface assistant application 500 incorporates a system model function 501, an interactive instructional feedback assistant 502 and a trusted platform hardware control feature 503, as shown in FIG. 5.

Figure 6:
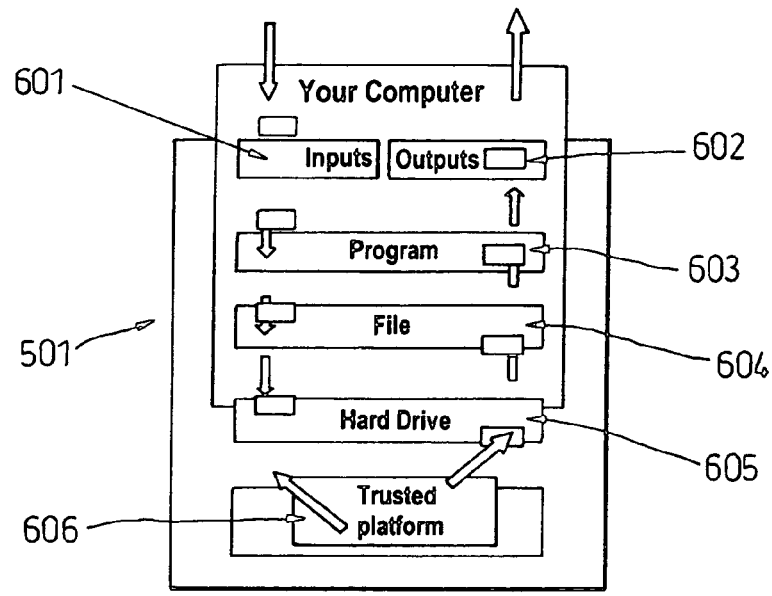
FIG. 6 illustrates the appearance of a system model.

FIG. 6 illustrates an example of how the system model could be presented to a user on the display 18. The system model 501 has reduced the computer platform to six major components (i.e. input 601, output 602, program 603, file 604, hard drive 605 and trusted device 606) that can be controlled by the trusted platform hardware control 503, as described below.

Figures 7A, 7B:
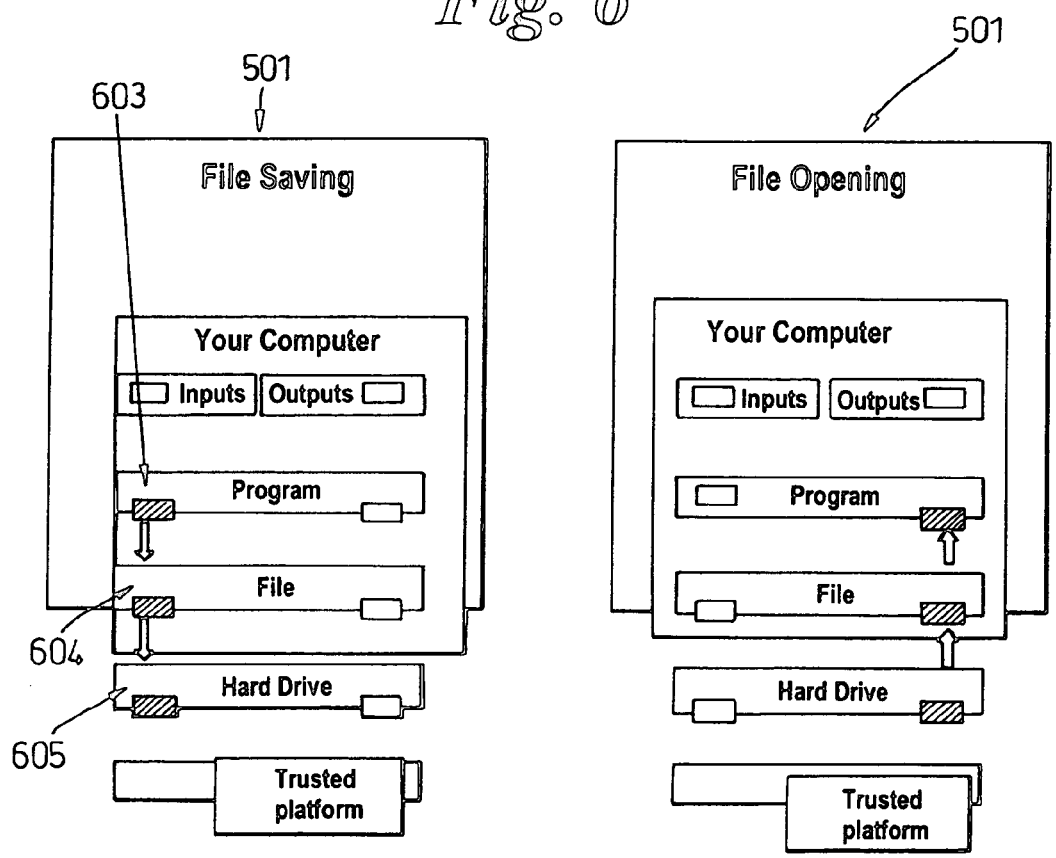
FIG. 7a illustrates the appearance of a system model representing a first example of system behaviour.
FIG. 7b illustrates the appearance of a system model representing a second example of system behaviour.

The system model 501 represents the system behaviour of the computer platform to a user by highlighting the system components involved in a particular system task and the relationship between those components, as illustrated in FIG. 7a and 7b. FIG. 7a shows the components involved in the writing of a file to the memory, i.e. the components program 603, file 604 and hard drive 605 are highlighted. Correspondingly, FIG. 7b shows the components involved in the execution of a program as being highlighted, i.e. hard drive 605, file 604 and program 603. In both cases appropriate arrows are highlighted to indicate the sequence of execution of the operation.

The system model 501 forms the central focus of the representational model of real-time happenings within the computer platform 10. The system model 501 can be arranged to respond to automatic functions within the computer platform 10 that normally happen unnoticed by the user (e.g. cookie file downloads, autosave/autorecover), as well as those functions which are related back to the user (such as opening a program or saving a file). By providing real-time feedback, via the system model 501, this allows a user to quickly get to know and understand the working of the computer in terms of the system model, even if they don't consciously attend to it.

As stated above, the system model 501 is a 'reduced' model of a computer platform that includes the hardware and software components. The model 501 is designed to represent to the user a high-level overview of a computer, which can allow high-level security functions to be carried out. Lower-level functionality is possible through 'drilling down' through the high-level model into a progressively more representational model of the computer platform and its components (i.e. providing a more complex system model).

Figure 8:
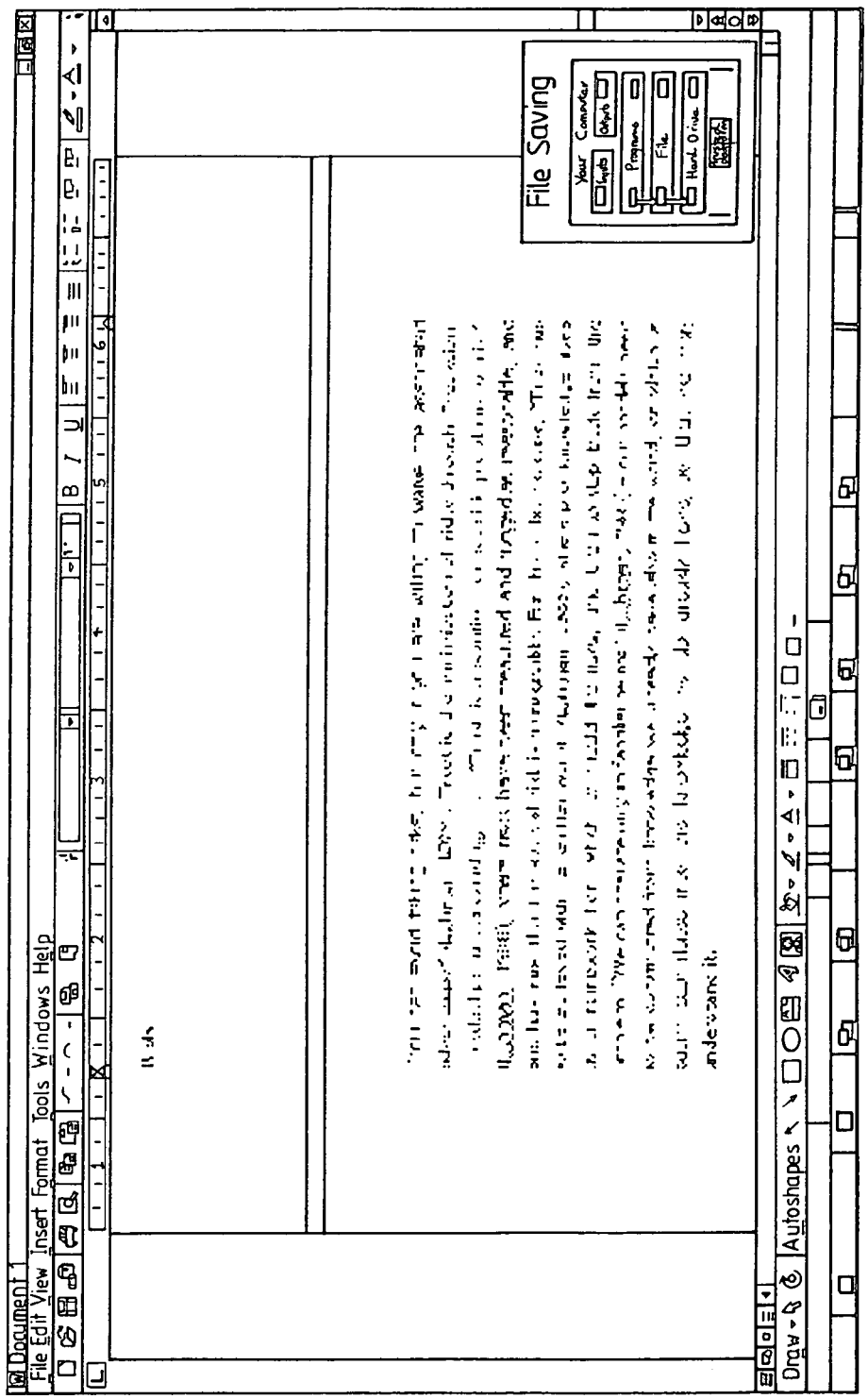
FIG. 8 illustrates an example of the relative size of the system model display in relation to screen size.

The system model 501 is represented on the display 18 and is the primary on-screen component of the interface assistant 500. The system model 501 is typically displayed either full-time in such a way that it does not obscure users from their primary tasks, or it can appear whenever the system performs some action (which shall then be represented to the user). FIG. 8 illustrates an example of the relative size of the system model display in relation to the display screen area. Every function carried out on the computer platform 10 will be translated to the user 'real-time', so that the user is aware of that function in terms of the system model 501. All hardware and software components are mapped by the trusted platform hardware control 503 so that any hardware or software which requires system resources can be determined by the trusted platform hardware control 503, if possible. A user does not need to respond to the system model 501 to cancel or to accept the 'real-time' representations of the system model (this real-time system model will work in a similar way to the computer's 'Task Manager'); these will carry on simultaneously until interrupted by the user, or by the interactive instructional feedback assistant 502, as described below.

The user may interrupt the system model 501 in order to request further information about some aspect of the system behaviour reported via the system model 501 by dragging the mouse over the system model representation, which will immediately reveal the trusted platform hardware control 503 display. If the user does not click on the trusted platform hardware control display, the system model 501 will return to view when the mouse is dragged off the display.

As described below, the interactive instructional feedback assistant 502 can interrupt the system model to emphasise any system behaviour which could be made more secure, via the trusted platform hardware control 503. This is carried out by checking the configuration of software and hardware with relation to the available security functions in the trusted platform hardware control 503 and the task being undertaken by the user (either all in relation to each other, or simply one against the other as in encryption, where sending a file will trigger feedback if the file has not been encrypted with the trusted platform hardware control 503) the trusted platform hardware control 503 can determine what suggested tasks can be presented to the user.

The system model 501 increases the familiarisation of user with the way the system behaviour of the computer platform is represented, and also to make the user more aware of system behaviour, and the behaviour of the trusted device in relation to the system behaviour. The user shall be able to review all these occasions if they wish, through the trusted platform hardware control 503, as described below.

The interactive instructional feedback assistant 502 represents relevant security concerns to the user in terms of the system model 501. The feedback assistant 502 recommends tasks to the user, in order to increase the security of the computer platform.

Figure 9:
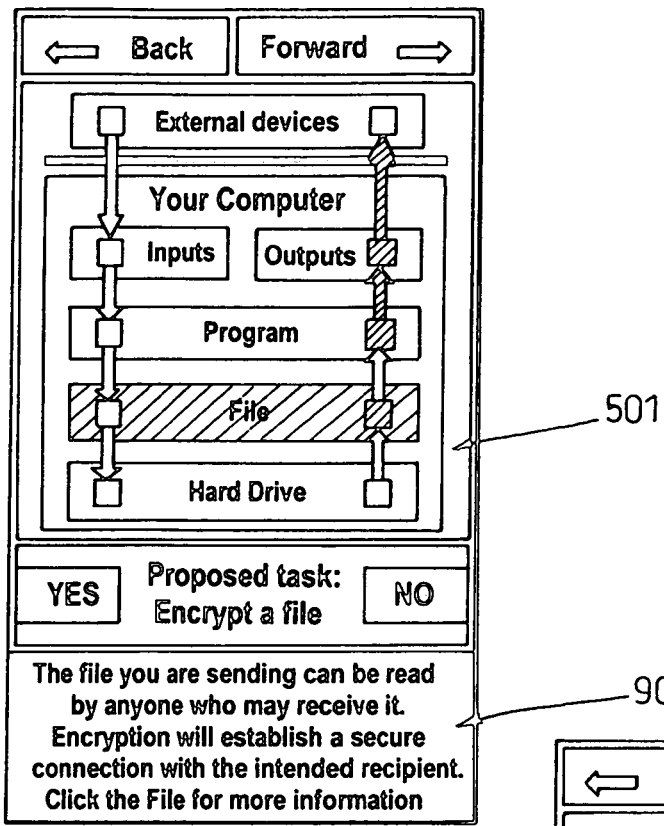
FIGS. 9 to 14 illustrates an example of the information provided by the interactive instructional feedback assistant.

FIG. 9 illustrates the system model 501 representing the components involved in the outputting of a file to an external device. The interactive instructional feedback assistant 901 presents to the user the risk associated with this action and suggests possible solutions, in this example the warning may comprise 'The file you are sending can be read by anyone who may receive it' and the proposed solution may be 'Encrypting will establish a secure connection with the intended recipient'. If required, the user selects file encryption, via the trusted platform hardware control 503, as described below. FIGS. 10 to 14 illustrate an example of how the interactive instructional feedback assistant can be configured to assist a user through the process of completing a security task, which in this example is the encryption of a file.

Figure 10:
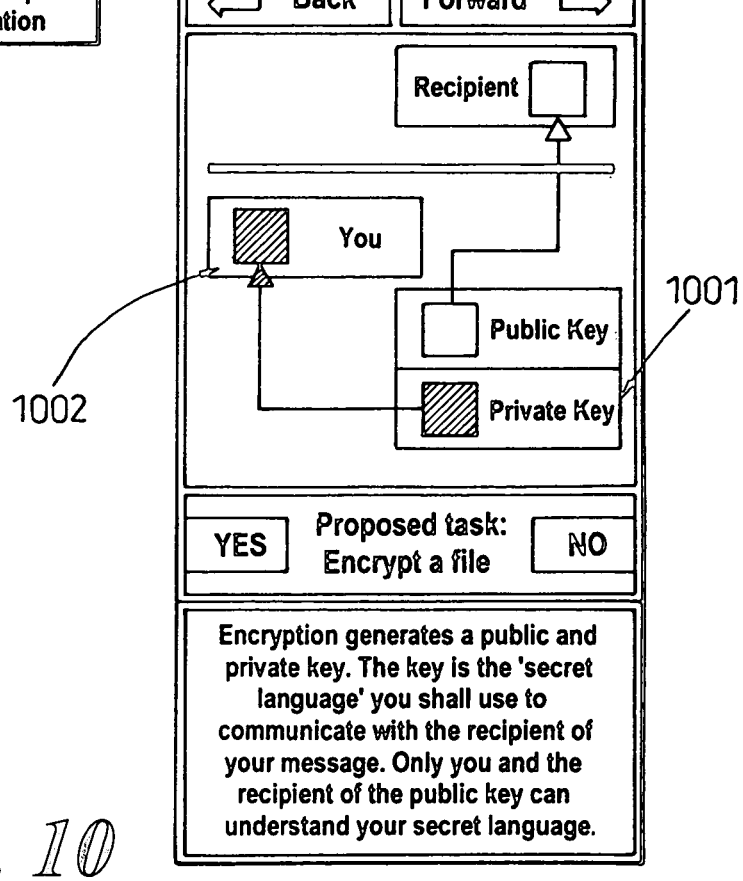

FIG. 10 shows the graphical representation of the generation of a private key 1001 provided to the user 1002 with the text message:

'Encryption generates a public and private key. The key is the secret language you shall use to communicate with the recipient of your message. Only you and the recipient of the public key can understand your secret language'

Figure 11:
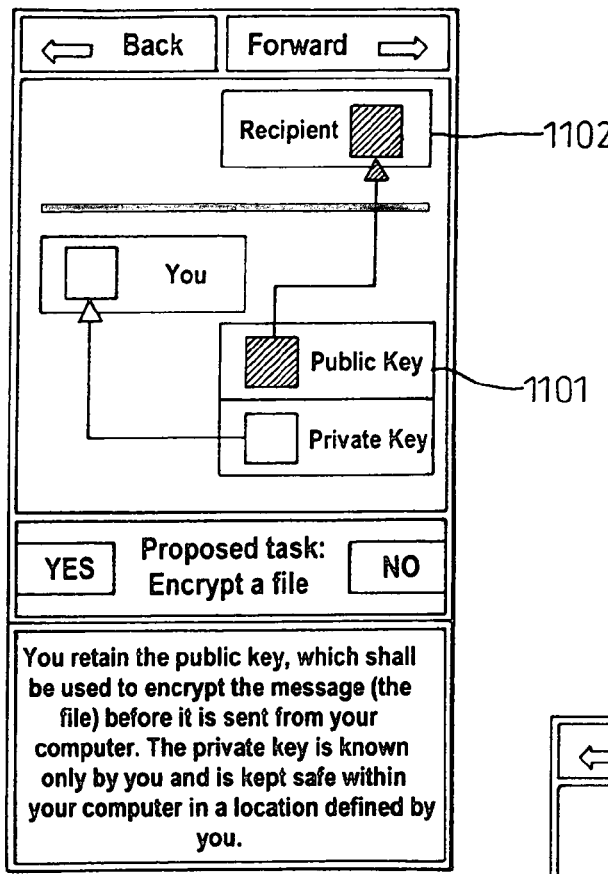

FIG. 11 shows the graphical representation of the generation of a public key 1101 provided to a recipient 1102 with the text message:

'You retain the public key, which shall be used to encrypt the message (the file) before it is sent from your computer. The private key is known only by you and is kept safe within your computer in a location defined by you.'

Figure 12:
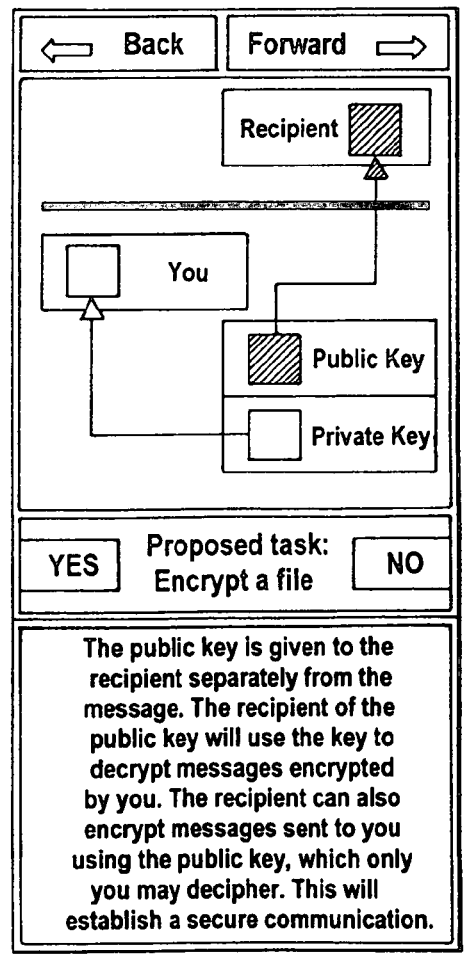

FIG. 12 provides the additional text message:

'The public key is given to the recipient separately from the message. The recipient of the public key will use the key to decrypt messages encrypted by you. The recipient can also encrypt messages sent to you using the public key, which only you may decipher. This will establish a secure connection.'

Figure 13:
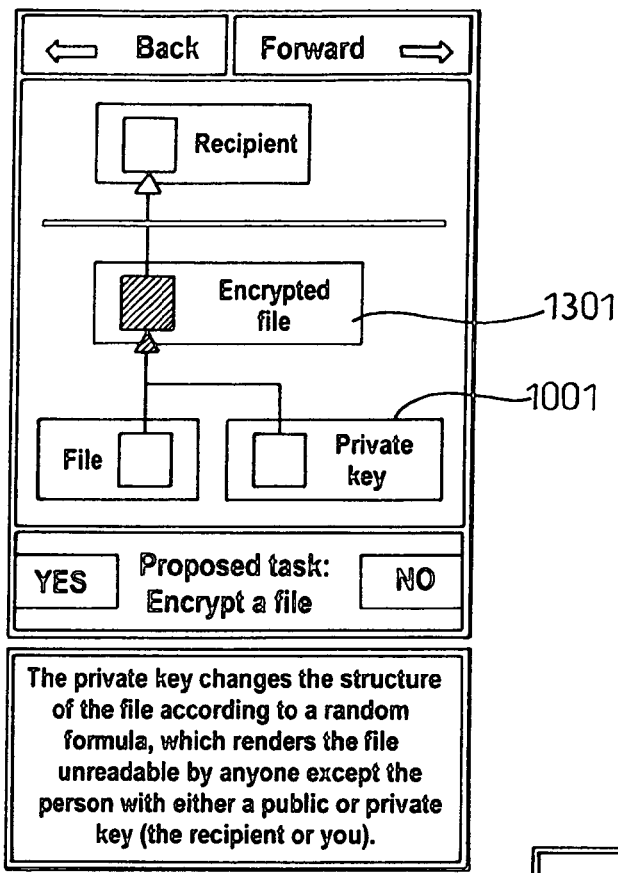

FIG. 13 shows the graphical representation of the encryption of a file 1301 with the private key 1001 including the text message:

'The private key changes the structure of the file according to a random formula, which renders the file unreadable by anyone except the person with either a public or private key.'

Figure 14:
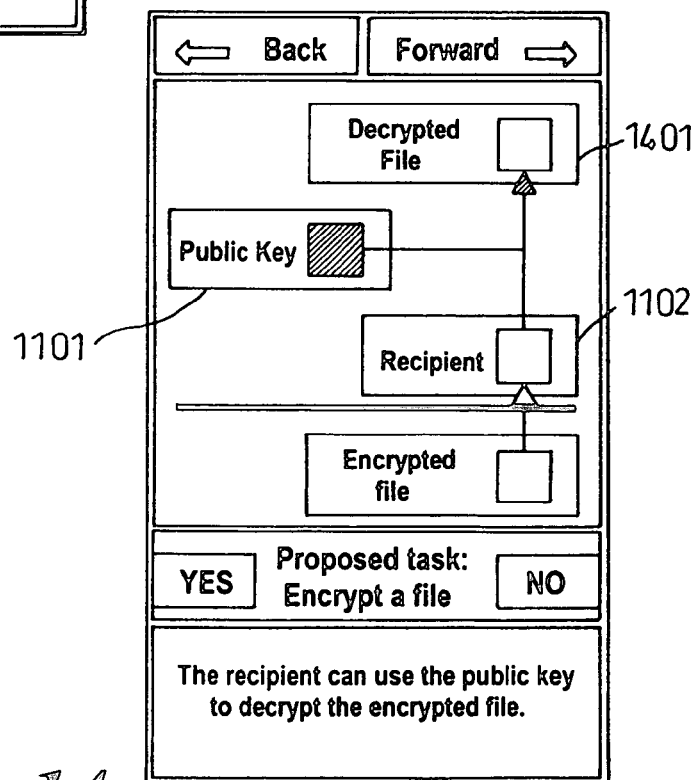

FIG. 14 shows the graphical representation of the decryption of the file 1401 by the recipient 1102 using the public key 1101, including the text message:

'The recipient can use the public key to decrypt the encrypted file.'

If the user is unsure of the security risk, or the security issue, they are able to progress through a simplified explanation of the security issues and the task based on the system model (e.g. by following on-screen prompts which guide the user through a short explanatory screen sequence explaining the task, not shown). The instructional feedback assistant allows users to drill down for further information about the task, or about the components of the system that may be affected by the task. The instructional feedback assistant 502 emphasises the way that security is derived from the computer platform, and how the trusted device 24 contributes to the separate security tasks recommended by the instructional feedback assistant 502.

The interactive instructional feedback assistant 502 can represent to the user an 'at risk' component (whether software or hardware). This representation typically takes on the form of the system model 501, or a simple representation derived from the system model. Along with the representation, a proposed task shall be presented to the user which will increase the security of the 'at-risk' component and/or other related components. If the user accepts the proposed task the trusted platform hardware control allows the user to perform the suggested task. If the user wants more information about the nature of the risk and the proposed solution, the interactive instructional feedback assistant 502 will take the user through a high-level description of the risk and the solution, and the major components and/or processes involved. These high-level descriptions incorporate diagrams derived from the system model 501 and text accompaniments. Users are able to click through the screens and then get the choice to follow through with the originally proposed security task, or just cancel.

Preferably, a history of cancelled tasks may be saved in a short-term memory store within the computer platform 10 for users to come back to.

Each screen presented by the interactive instructional feedback assistant 502 allows the user to drill for further information about the components represented to them on the screens, and then return back to the original screen. Preferably, all actions can be cancelled, and all screens are navigable in a similar manner and using similar mechanisms to an Internet browser i.e. users are able to go forward/back individual screens, or jump screens, whilst always being able to find their way back to where they began.

Preferably, users are able to configure the instructional feedback assistant 502 to determine whether the feedback assistant 502 will interrupt the user if there is a potential security risk, or whether the feedback assistant 502 will attempt to grab the user's attention without interrupting their task. This can be achieved by selecting the appropriate option in a 'SET-UP' screen (not shown) which is accessed by clicking on Set-up in the trusted platform hardware control menu screens, not shown.

The interactive instructional feedback assistant 502 represents a subset of services that are provided or supported by the computing platform 10. Possible tasks and instructions include encryption, virus checking, file management (cookie files, temporary files, etc), application configuration (to a more secure configuration), intrusion detection, file download, Internet transactions, etc.

The representation of the process of encryption is preferably at a high level, and directly related to the system model 501. Lower-level information can be found by clicking-down through the separate screens, revealing greater depths of information on an ever-more technical level, represented to the user via the LOW/MEDIUM/HIGH complexity icons (not shown). This enables users to advance their technical knowledge through the interface.

All immediate information is presented to the user at a high-level. Once the user gets familiar with the task presented to them, they can begin to view lower-level instructions without having to drill through the high-level instructions—this is a configuration they are able to determine. This is achieved by setting a control which reveals more functions and further descriptions to the user, in ever more technical language as is necessary for the description. The control for this function takes on the form of a LOW/MEDIUM/HIGH setting (not shown), which can be changed at any time during any task. The result of this change would be that each high-level screen (LOW complexity) would be substituted for a more technical representation of the task, depending on the setting. The more technical screens would be directly analogous to the high-level screens and functions, enabling direct comparisons and references to be made, which would further increase knowledge transfer and learning Preferably, users can go straight to the proposed task screens, which in the case of encryption, would allow the user to go straight to the process of file encryption.

Figure 15:
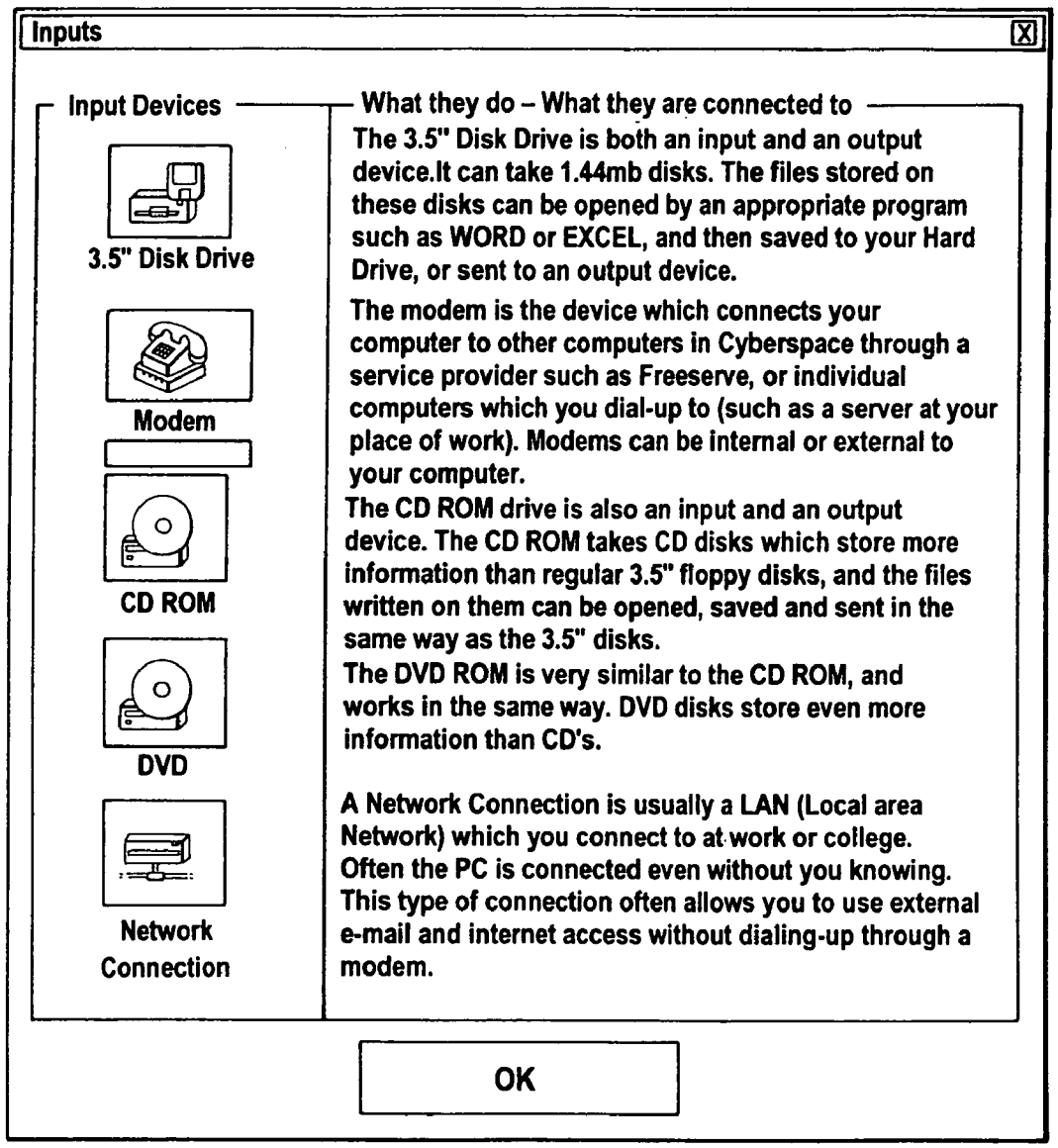
FIG. 15 illustrates an example of a system model icon that has been drilled down for more detailed information.

FIG. 15 illustrates an example of a display where the input icon of the system model 501 has been drilled down to provide more detailed information on the input devices.

A similar screen would also represent available output devices (which often serve as both input and output devices). The above information screen would be marked as LOW/MEDIUM/HIGH complexity so that users may determine whether they need this information to carry out the task presented to them. It would be possible to click on the icons represented on these screens for relevant but more complex information on the proposed encryption task.

The trusted platform hardware control 503 is the functional component of the interface assistant 500. This control is accessed either from the instructional assistant 502 (when it interrupts the user signifying a potential security risk), or through the system model of the system (which is preferably constantly present on the desktop), or available to call-up at anytime through a short-cut key or via an icon in the start-up menu. The control 503 allows the user to select a security function from a component specific menu (i.e. Hard-Drive, Inputs/Outputs, File, Program, etc), by clicking on a component icon/button upon the system model. For example, clicking on the hard drive icon 605 may suggest virus scanning, integrity checking, file management, specific to the hard drive. Alternatively, clicking on the output icon/button 602 would give a list of output components (Disk Drive, Modem, etc). If one were to select the modem, then virus scanning may not be a relevant option, whereas intrusion detection would be. This is what is meant by 'context specific'.

Preferably, if at any time during using the trusted platform hardware control 503 the user requires further information, the user can request the context dependent interactive instructional feedback assistant 502 to represent to them the relevance of the functions contained within the control, in relation to the system model 501 and the system behaviour, or the current risks associated with the component configuration and the expected gains from the suggested changes to the component configuration, as described above. This can be done by clicking on the interactive instructional feedback assistant 502 which will provide help for any highlighted topic on one of three levels (LOW/MEDIUM/HIGH complexity—selected from a button from within the screen opened by the interactive instructional feedback assistant Button, not shown).

The trusted platform hardware control 503 will represent possible functions to the user in one of a number of ways.

The users will have a system model 501 with which they can click and select components they wish to examine, configure, and set-up according to the services provided by the trusted platform hardware control 503. The user will be given the option to use major security functions from the outset i.e. encryption, virus scanning, integrity checking, etc., which will be available through clicking onto an icon (for example, a Trusted Platform icon).

Optionally, there is also a second form of accessing functions, which is a general security menu suggesting functions such as integrity checking of the computer platform 10 via the trusted platform hardware control 503. This option would be presented to the user as an alternative to the above option, and would be accessed from the first option screen, by clicking on a menu button, and then the Security functions button. Users would be able to scroll through security functions (not shown), and get a brief description of each of those functions, and options relevant to those functions (e.g. Virus scanning will give options to scan messages in mail, to scan disks, or configure the scanner, etc). They can also choose to get the interactive instructional feedback assistant 502 to take them through the function by clicking on the relevant icon when the function is highlighted.

The user is able to specify a secure configuration for the entire computer or individual components on three different levels (LOW/MEDIUM/HIGH-complexity) requiring different knowledge levels. This service would be available through either of the main trusted platform hardware control 503 menus. The trusted platform hardware control 503 allows the user to refer back to the instructional device if they had a difficulty configuring the trusted platform hardware control 503 (an icon for the interactive instructional feedback assistant 502 will be present on all screen to help with all major functions). Any changes made to the trusted platform hardware control 503 would be reversible, with all previous configurations saved according to date and time of the configuration change, and accessible through the function menu. These saved configurations can be reinstated at any time up to a point, when the configurations shall be deleted from a short-term memory store.

Figure 16:
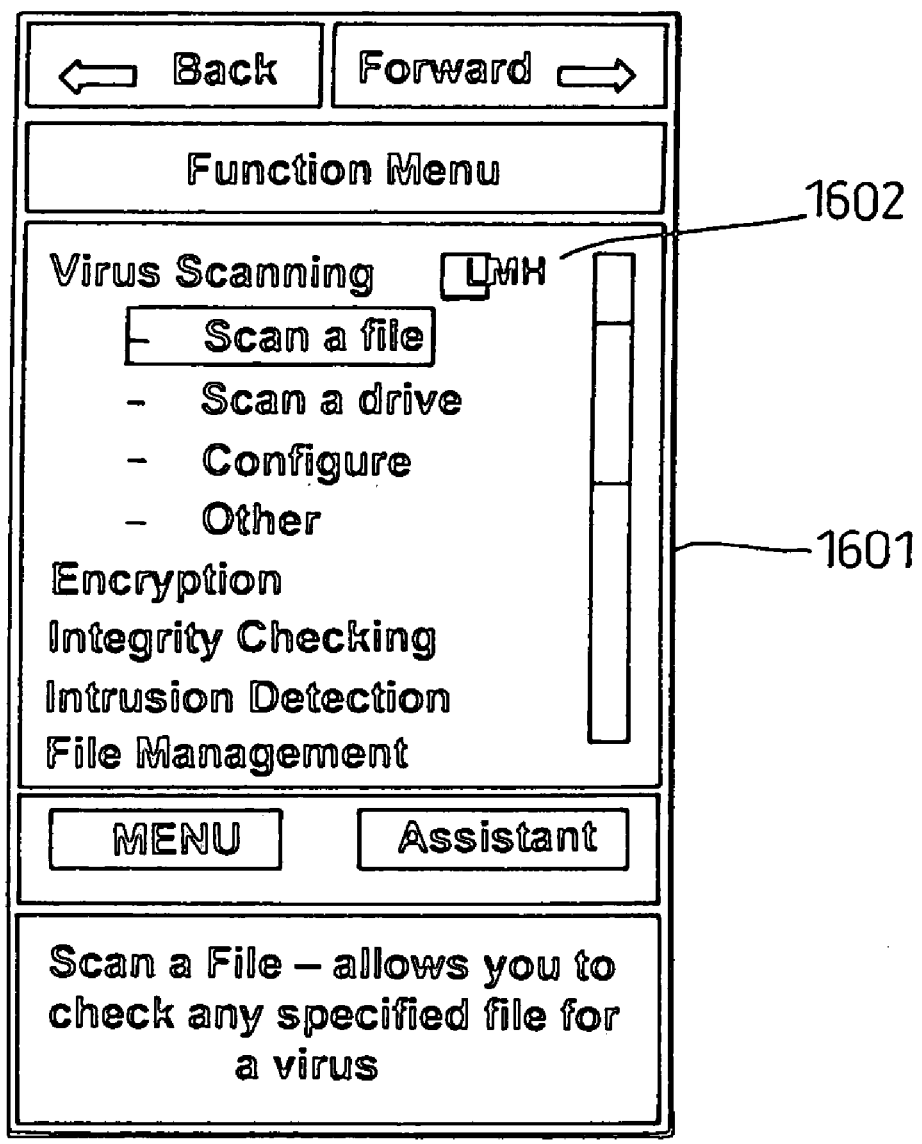
FIG. 16 illustrates an example of a trusted platform hardware control menu.

The trusted platform hardware control 502 allows the full functionality of the platform to be explored and configured from a number of levels via the trusted platform hardware control menus 1601, see FIG. 16, and by specifying the complexity level of functions through clicking on the HIGH/MEDIUM/LOW icon 1602. A hierarchical distinction between functions shall be made based on necessary expertise required (LOW/MEDIUM/HIGH complexity).

Preferably the trusted platform hardware control 502 will allow users to configure individual security components and global security set-ups [for example, by the trusted platform hardware control sending commands to the OS or by storing such configurations in a file that is accessed by software specialised to carry out such configuration]. Essential to the computing platform security is the users capacity to be able to request the platform to configure non-trusted platform components including software (such as Internet Explorer, WORD, etc) and hardware (such as Network connections) to run in a secure way suggested by the trusted platform hardware control 502 or by the user.

Optionally, all changes to configurations shall be filed so that a test period can be undertaken under the new configuration. In this case the user will be allowed to return to the original configuration within a set time if the new configuration is not acceptable to their requirements. The set time for returning to an original configuration is determined by the short-term memory storage of the original configuration metrics.

The trusted platform hardware control 503 allows users to request certain metrics from the computer platform 10 such as which users had accessed the machine and when, or what changes had occurred to the machine since some set period of time, or some other mark—such as the last time a specific user had used the machine, which shall be reported back to the user in the form of the user's choice e.g. as a report on start-up, or stored and available if requested.

Preferably, the trusted platform hardware control 503 will allow the user to isolate or quarantine files/folder/programs or even hardware devices, in order to further increase the security of the computer platform under certain high-security conditions, or to reduce the potential of harm befalling these components during 'high-risk' exercises (e.g. downloading a suspect file or program, etc). This can be achieved by using compartmentalisation within the computer apparatus.

Other components' configuration tasks can be obtained by clicking on the relevant component icon and then searching for a specific component to configure, or by applying global configurations to a class of components. At all stages the user may refer to the interactive instructional feedback assistant 502 for advice or explanations.

What we claim:

1. Security apparatus comprising:
    means for representing to a user a plurality of components of a computer platform;
    means for representing to the user interactions among the plurality of components; and
    means for allowing the user to modify a security setting associated with at least one of the plurality of components.

2. Security apparatus according to claim 1, wherein the means for representing the plurality of components comprise: means for representing software and/or hardware functionality of the computer platform.

3. Security apparatus according to claim 1, further comprising input means for allowing the user to interact with the modifying means to modify the security setting.

4. Security apparatus according to claim 1, further comprising means for providing possible modifications to the security setting.

5. Security apparatus according to claim 1, wherein a level of complexity of representing to the user the plurality of components is selectable by the user.

6. Method for modifying the security status of a computer apparatus, the method comprising:
    representing to a user a plurality of components of a computer platform;
    representing to the user interactions among the plurality of components; and
    allowing the user to modify a security setting associated with at least one of the plurality of components.

7. The method according to claim 6, wherein representing the plurality of components comprises:
    representing software and/or hardware functionality of the computer platform.

8. The method according to claim 6, further comprising:
    presenting to the user possible modifications to the security setting.

9. The method according to claim 6, further comprising:
    allowing the user to select a level of complexity of representing to the user the plurality of components.

10. A computer system, comprising:
    a memory to store computer-readable code; and
    a processor operatively coupled to said memory and configured to implement said computer-readable code, said computer-readable code being configured to:
    represent to a user a plurality of computer components;
    represent to the user interactions among the plurality of computer components; and
    allow the user to modify a security setting associated with at least one of the computer components.

11. The computer system according to claim 10, wherein representing the plurality of computer components comprises:

representing software and/or hardware functionality of a computer.

12. The computer system according to claim 10, wherein the computer-readable code is further configured to:
   present the user possible modifications to the security setting.

13. The computer system according to claim 10, wherein the computer-readable code is further configured to:
   allow the user to select a level of complexity of representing to the user the plurality of computer components.

14. Method for modifying the security status of a computer component, the method comprising:
   depicting a plurality of computer components;
   depicting interactions among the plurality of computer components; and
   allowing modification of a security setting associated with at least one of the computer components.

15. The method according to claim 14, wherein depicting the plurality of computer components comprises:
   depicting software and/or hardware functionality of a computer.

16. The method according to claim 14, further comprising:
   presenting possible modifications to the security setting associated with one or more of the computer components.

17. The method according to claim 14, further comprising:
   allowing selection of a level of complexity for displaying the plurality of computer components.

* * * * *